US011965457B2

(12) United States Patent
Dmytrow et al.

(10) Patent No.: US 11,965,457 B2
(45) Date of Patent: Apr. 23, 2024

(54) METHOD AND APPARATUS FOR TRANSFERRING AUXILIARY POWER FROM AN ENGINE CRANKSHAFT OUTPUT TO A SUPERCHARGER INPUT THAT CIRCUMVENTS BELT PATH OBSTACLES

(71) Applicant: Magnuson Products, LLC, Ventura, CA (US)

(72) Inventors: Erin Micheal Dmytrow, Lasalle (CA); James Hewett, Palm Coast, FL (US)

(73) Assignee: Magnuson Products, LLC, Ventura, CA (US)

( * ) Notice: Subject to any disclaimer, the term of this patent is extended or adjusted under 35 U.S.C. 154(b) by 0 days.

(21) Appl. No.: 18/066,797

(22) Filed: Dec. 15, 2022

(65) Prior Publication Data

US 2023/0193816 A1 Jun. 22, 2023

Related U.S. Application Data

(60) Provisional application No. 63/290,143, filed on Dec. 16, 2021.

(51) Int. Cl.
| | |
|---|---|
| *F02B 67/10* | (2006.01) |
| *F02B 33/38* | (2006.01) |
| *F02B 67/06* | (2006.01) |
| *F16H 7/02* | (2006.01) |
| *F16H 7/08* | (2006.01) |
| *F16H 7/12* | (2006.01) |

(52) U.S. Cl.
CPC .............. *F02B 67/10* (2013.01); *F02B 33/38* (2013.01); *F02B 67/06* (2013.01); *F16H 7/02* (2013.01); *F16H 7/1254* (2013.01); *F16H 2007/0865* (2013.01); *F16H 2007/0897* (2013.01)

(58) Field of Classification Search
CPC .......... F02B 67/10; F02B 33/38; F02B 67/06; F16H 7/02; F16H 7/1254; F16H 2007/0865; F16H 2007/0897
See application file for complete search history.

(56) References Cited

U.S. PATENT DOCUMENTS

| | | | | |
|---|---|---|---|---|
| 2009/0255741 | A1* | 10/2009 | Major | B60K 6/48 474/84 |
| 2011/0150671 | A1* | 6/2011 | Ouwenga | F04C 29/025 418/206.1 |

(Continued)

*Primary Examiner* — Brandon D Lee

(57) ABSTRACT

A method and apparatus that circumvents belt path obstacles in a Corvette C8 engine for transferring auxiliary power from the engine crankshaft output pulley to a supercharger input pulley by using a drive path transfer apparatus including a transfer input pulley located in the same plane as the crankshaft pulley and connected to it with the main drive belt, a transfer output pulley in a second plane spaced inboard of the first plane including the supercharger pulley, a secondary belt joining the transfer output pulley and the supercharger pulley, and a coupling shaft having the transfer input pulley at one end and the transfer output pulley at the other end, the coupling shaft being rotationally mounted in a two-piece installable bracket secured on the engine block in a location to the side of the obstruction, thereby transferring power from the engine to the supercharger without interference from the obstruction.

12 Claims, 6 Drawing Sheets

(56) References Cited

U.S. PATENT DOCUMENTS

| 2015/0183421 A1* | 7/2015 | Baliff | F02B 39/12 |
| | | | 180/65.265 |
| 2018/0045103 A1* | 2/2018 | McClellan | F16H 3/66 |
| 2019/0001806 A1* | 1/2019 | Takami | B60L 50/16 |

* cited by examiner

METHOD AND APPARATUS FOR TRANSFERRING AUXILIARY POWER FROM AN ENGINE CRANKSHAFT OUTPUT TO A SUPERCHARGER INPUT THAT CIRCUMVENTS BELT PATH OBSTACLES

CROSS-REFERENCE TO RELATED APPLICATIONS

This application claims the benefit of provisional application 63/290,143, filed Dec. 16, 2021.

BACKGROUND OF THE INVENTION

In creating a Roots-type supercharger with meshing rotors for the rear engine Corvette C8, it is necessary to provide rotational power for the supercharger rotors from the engine's crankshaft through the existing pulley and belt arrangement already provided by the manufacturer to power various engine accessories, such as the electrical alternator and pumps. However, space constraint problems immediately arise because the engine is rear-mounted and has its auxiliary drive pulley and belt arrangement facing the rear of the vehicle, and the engine compartment does not allow any significant outward expansion of existing equipment. The supercharger is mounted on top of the engine to cylinder heads approximately at the lateral midpoint of the engine and the supercharger rotor shaft and pulley that act as the input for driving the supercharger rotors are at the same end of the engine as the auxiliary drive. In a standard supercharger installation, the supercharger rotor shaft pulley would be positioned to be driven by the main drive belt commonly driving the other engine accessories in an extended loop. However, the following complication arises from the engine design: the C8 engine has a dry sump oil reservoir which protrudes from the same end of the engine as the auxiliary drive and presents an obstacle that would interfere with the path of a supercharger drive belt that is a continuation of the existing pulley and belt arrangement.

It is not feasible to modify the supercharger by relocating the supercharger pulley to avoid the dry sump oil reservoir without major redesign efforts not justified by the cost and uncertainty required, and a jackshaft arrangement to transfer power to the forward end of the supercharger is not feasible because the supercharger air intake is located there. It similarly is not feasible to have the belt avoid the dry sump oil reservoir by creating a belt path around the side of the dry sump oil reservoir using idler pulleys because other accessory drive pulleys are in the way. To make this solution work, existing auxiliary components would have to be repositioned and engine compartment space constraints make that at best a difficult solution and at worst an impossible solution. One known technique for adding auxiliary components is to add a second drive pulley to the crankshaft outboard of the existing drive pulley, and to use a second belt driven by the second drive pulley for the additional components, but again engine compartment space constraints make that solution not feasible. Finally, a potential solution is to modify the shape of the dry sump oil reservoir to provide a clear belt path, but that solution not only would add considerably to the cost and complexity of the supercharger addition, it also potentially could introduce additional problems related to the dry sump function. Accordingly, it would be desirable to find a way to power the supercharger from the engine crankshaft without relocating existing auxiliary equipment, without modifying the dry sump oil reservoir, and at the same time staying within the space constraints imposed by the tight confines of the engine compartment.

SUMMARY OF THE INVENTION

The present invention achieves these goals of providing power to a supercharger using an existing accessory drive system when the engine design presents both engine compartment space constraints and the existence of an obstacle in the form of, for example, a dry sump oil reservoir, and the supercharger rotor shaft pulley is positioned above the engine block in a space located inboard of both the existing accessory drive plane and the obstacle (the dry sump oil reservoir), i.e., in the space between the supercharger housing and the existing drive plane and the obstructing dry sump oil reservoir. In accordance with the present invention, a drive path transfer apparatus is mounted to the engine and includes a bracket carrying a coupling shaft one end of which has an input pulley positioned away from the side of the obstructing dry sump oil reservoir in a location where a drive belt around the input pulley connecting with the existing accessory drive will not be interfered with by the obstructing dry sump oil reservoir, and in the plane of the existing accessory drive, so that it can be driven by the same auxiliary main drive belt used for other auxiliary devices. The other end of the coupling shaft has an output pulley, inboard of the input pulley, in the plane of the supercharger rotor shaft pulley and connected to it via a secondary drive belt which also is located in the space between the supercharger housing and the obstructing dry sump oil reservoir where it is free of interference with the obstructing dry sump oil reservoir. Through use of this apparatus, and by establishing a new secondary drive path spaced inboard of the main drive path, it is possible to transfer power from the crankshaft while circumventing the obstructing dry sump oil reservoir, and to efficiently transfer power to the supercharger while at the same time not outwardly expanding the space needed and thereby fitting within the space constraints of the engine compartment.

The coupling shaft typically is short (e.g., 6-9 inches) and so does not experience large twisting moments that would put it out of alignment. It can be seen as performing a function similar to that of a short jackshaft but one that is reversed in direction from the usual orientation of a jackshaft, in this instance extending outboard (outward and away from the end of the supercharger housing) rather than the usual jackshaft configuration which extends rearward towards the opposite end of the supercharger housing.

In another aspect of the invention the bracket is a two-piece assembly comprising a first bracket component attached, e.g., with a first set of bolts, to the engine block, and a second bracket component attached, e.g., with a second set of bolts, to the first bracket component and carrying the coupling shaft and input and output pulleys. This arrangement permits the second bracket component to be independently detached for maintenance or repair of the coupling shaft and input and output pulleys, which in a one-piece bracket otherwise would require removal of the engine, and further permits the bracket to be installed in the very confined space available without removal of the engine by first attaching the first bracket component to the engine block in an available fore and aft space, and then attaching the second bracket component to the first bracket component in an available lateral space.

BRIEF DESCRIPTION OF DRAWINGS

FIG. 4 is a perspective view showing the drive path transfer apparatus according to the invention and the engine parts it connects to.

DETAILED DESCRIPTION OF THE INVENTION

Figure 1:
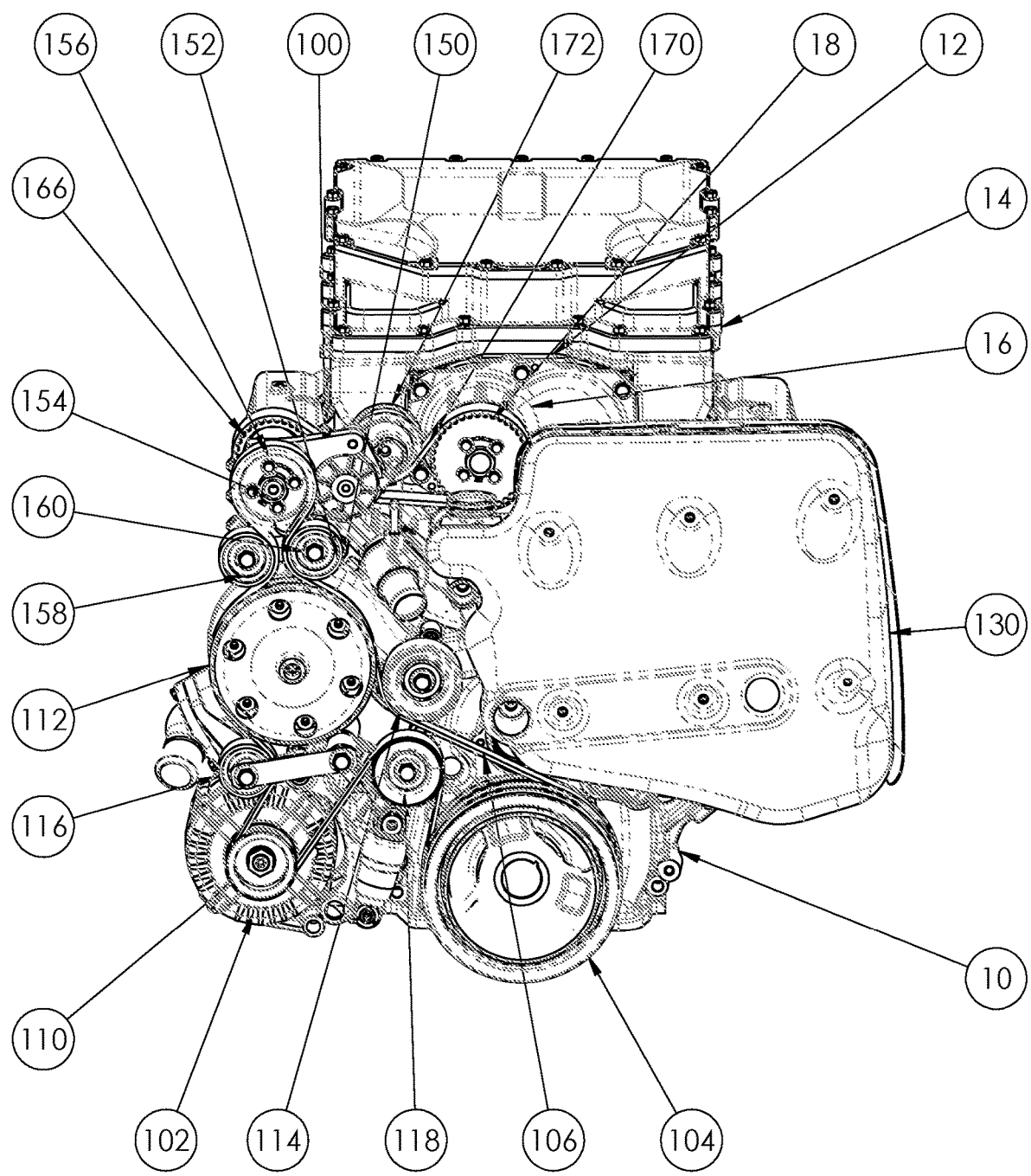
FIG. 1 is an end view of an engine with a supercharger attached according to the present invention.
Figure 2:
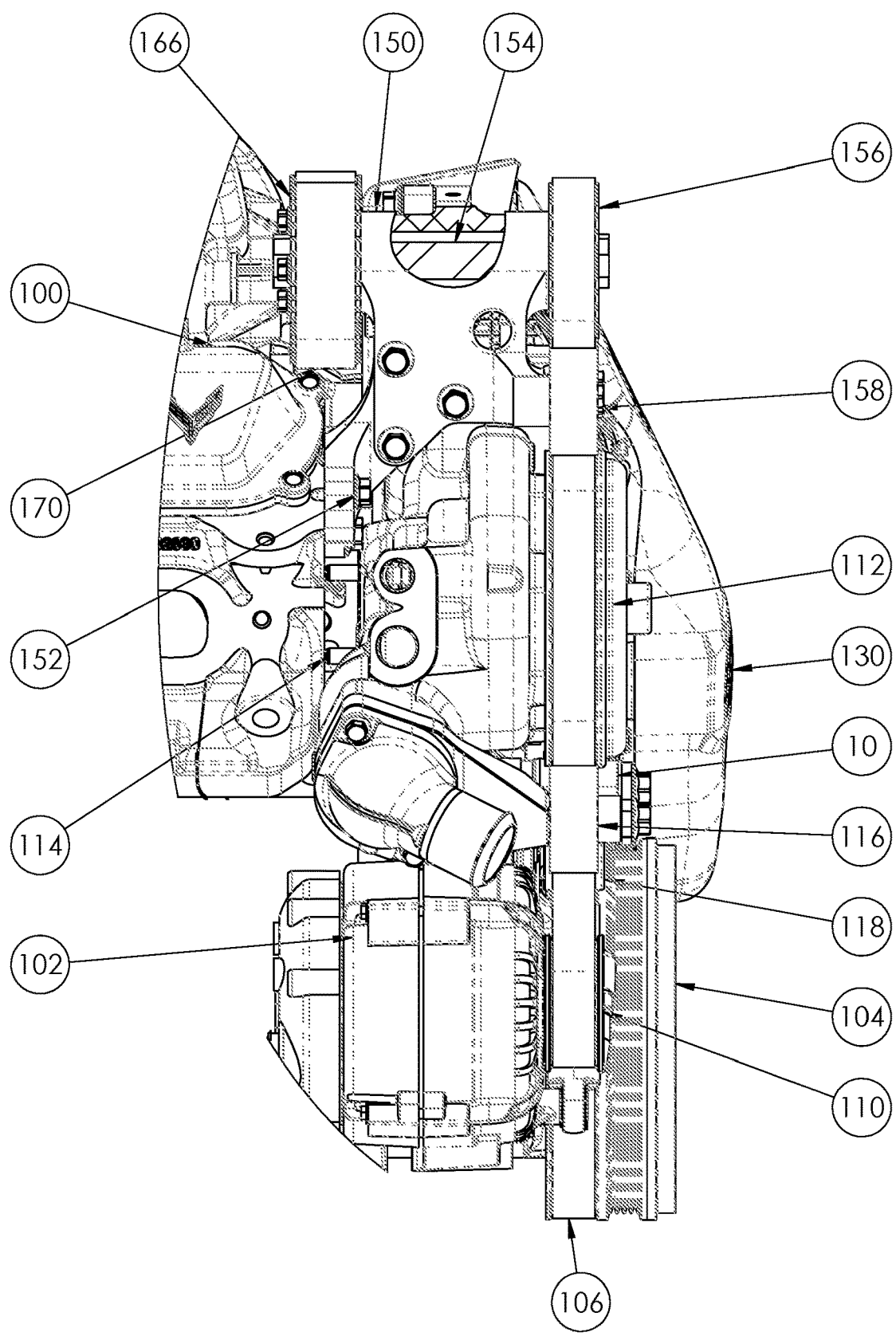
FIG. 2 is a side view of the engine of FIG. 1.
Figure 3:
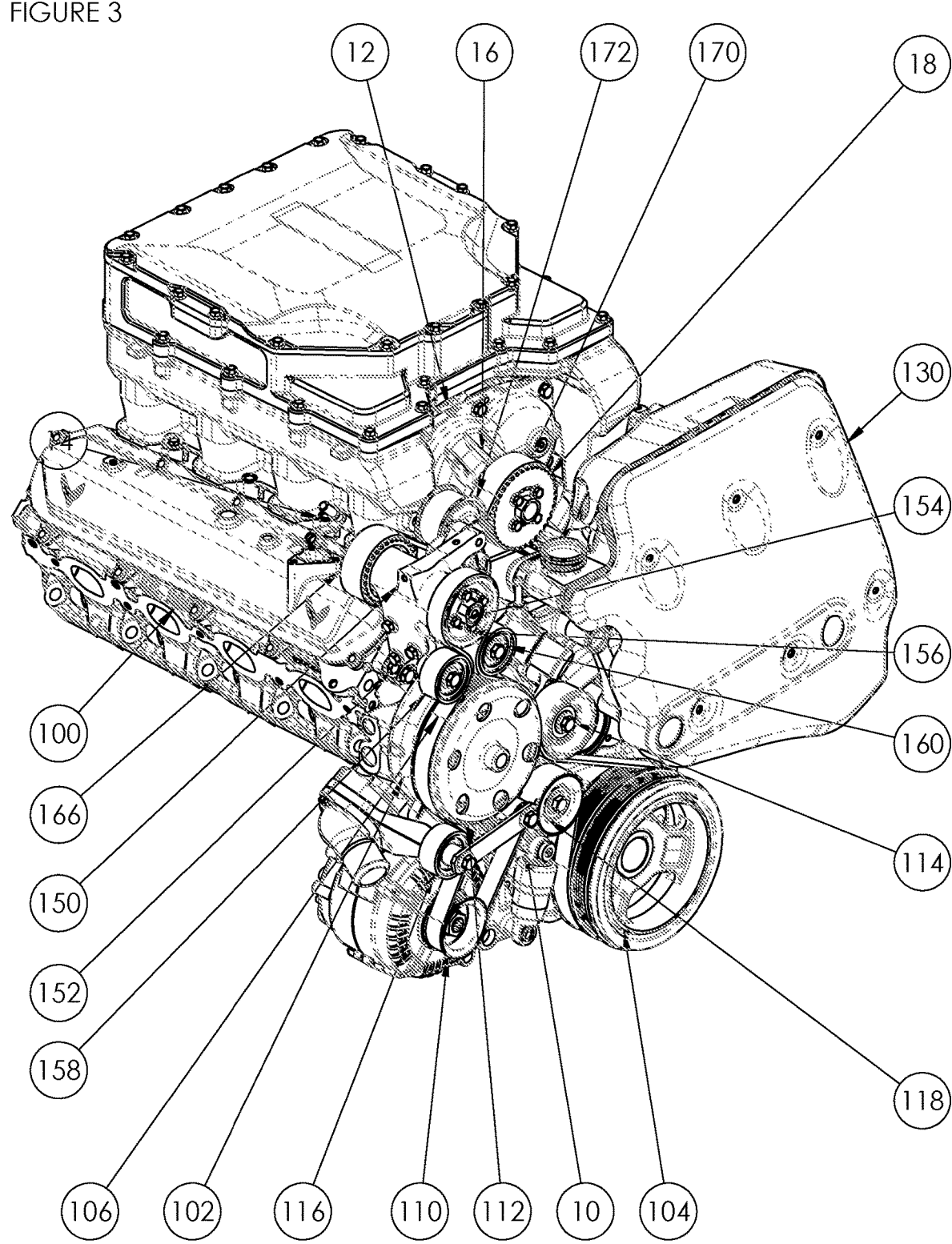
FIG. 3 is a perspective view of the engine of FIGS. 1 and 2.

FIGS. 1-3 show an engine 10, which in this example is the rear-mounted V-8 engine used in the Chevrolet Corvette C8, to the top of which a Roots-type supercharger 12, such as a Magnuson Products supercharger using Eaton rotors, is attached. As is typical the supercharger 12 has a housing 14 mounted at the midpoint of the engine and containing (not shown) two meshing rotors that propel air into the engine intake manifolds when rotated. One rotor shaft 16, connected by gears to the second rotor shaft, carries a pulley 18 to be rotationally powered by a belt, which typically is either smooth or serrated to prevent slippage.

The engine 10 has an engine block 100 at one end of which is located an auxiliary drive system 102 with a crankshaft pulley 104 carrying a main drive belt 106 that is coupled to auxiliary devices through drive pulleys such as alternator pulley 110 and pump pulley 112 and guided by idler and tensioner pulleys 114, 116, 118. The engine 10 also has an obstructive object in the form of a dry sump oil reservoir 130 located at the same end of the engine block 100 as the auxiliary drive system 102 and protruding into the plane formed by the main drive belt 106 and pulleys 104-118. As shown in FIG. 1, viewed from the end of the engine 10, the obstructing dry sump oil reservoir 130 has an irregular outline but is approximately trapezoidal or rectangular and sits in the upper right quadrant of the crankshaft pulley 104 where it would obstruct the path of a belt extending upward from the right side of the crankshaft pulley 104 to the right side of supercharger pulley 18. Viewed from the side of the engine, as shown in FIGS. 2 and 3, the obstructing dry sump oil reservoir 130 similarly is approximately rectangular and extends outward from the side of the engine block 100 into the plane formed by main drive belt 106, the crankshaft pulley 104 and other accessory pulleys 106-118, and further extends above the engine block 100 and above the lower edge 18e of the supercharger pulley 18.

In accordance with a preferred embodiment of the invention the engine 10 has a drive path transfer apparatus A (shown attached to the engine in FIGS. 1-3 and separately in FIGS. 4 and 5) having a bracket 150, made of machined aluminum for example, attached to the engine block 100 with bolts 152. Bracket 150 supports for rotation a coupling shaft 154 (represented by dashed lines in FIG. 2) whose axis is parallel to the axes of pulleys 104-118. Mounted on one end of coupling shaft 154 is an input pulley 156 located in the plane of pulleys 104-118 and main drive belt 106 and positioned to carry main drive belt 106. Idler/tensioner pulleys 158, 160 secure belt 106 on pulley 156 to prevent slippage. Mounted on the other end of coupling shaft 154 is an output pulley 166 located inboard of the plane of pulleys 104-118 and belt 106 and inboard of obstructing dry sump oil reservoir 130 in the space between obstructing dry sump oil reservoir 130 and supercharger housing 14 and in the plane of supercharger pulley 18. A secondary drive belt 170 joins output pulley 166 and supercharger pulley 18. The secondary drive belt 170 is shown as a cogged belt for reduced slippage, but alternatively may be a continuous smooth belt for reduced noise. A spring-loaded dynamic tensioner pulley 172 maintains tension in the secondary drive belt 170. Power is transmitted in a first drive path from crankshaft pulley 104 via main drive belt 106 to input pulley 156, then is transferred via coupling shaft 154 to a second drive path comprising output pulley 166, secondary drive belt 170, and supercharger pulley 18, and then to rotor shaft 16 to power the supercharger. This use of a first drive path coupled to a second drive path spaced inboard of it circumvents the obstructing dry sump oil reservoir 130, which means the dry sump oil reservoir needs no modifications; utilizes existing auxiliary drive components, which means they do not require relocation; and enables standard supercharger architecture to be used. [For clarification, the terms "inboard" and "outboard" as used in this description correspond to "forward," i.e., toward the front of the vehicle, and "rearward," i.e., toward the back of the vehicle, in the context of the rear-engine C8, with the engine's auxiliary drive pulleys and the supercharger's drive pulley both facing toward the rear of the vehicle. i.e., "rearward". "Fore and aft" refers to a direction parallel to the axis of the crankshaft pulley, and "lateral" or "sideways" refers to a direction perpendicular to the fore and aft direction.]

Advantageously, the drive path transfer arrangement described above can be achieved with a simple bracket and coupling shaft to enable an effective method for transferring power from a first plane (that of the crankshaft pulley 104, main drive belt 106, and accessory pulleys 108-118, and input pulley 156) to a second plane (that of output pulley 166, secondary drive belt 170, and supercharger pulley 18) that is forward of and does not intersect the obstruction 130 and yet is rearward of the supercharger housing 14 in an available space. The components in the first plane function as a primary drive train which then uses input pulley 156, coupling shaft 154 and output pulley 166, located remotely from the crankshaft pulley 104 and to one side of the obstructing object (the dry sump oil reservoir 130), to create a secondary drive train to power components, such as a supercharger, in the second plane.

Figure 4:
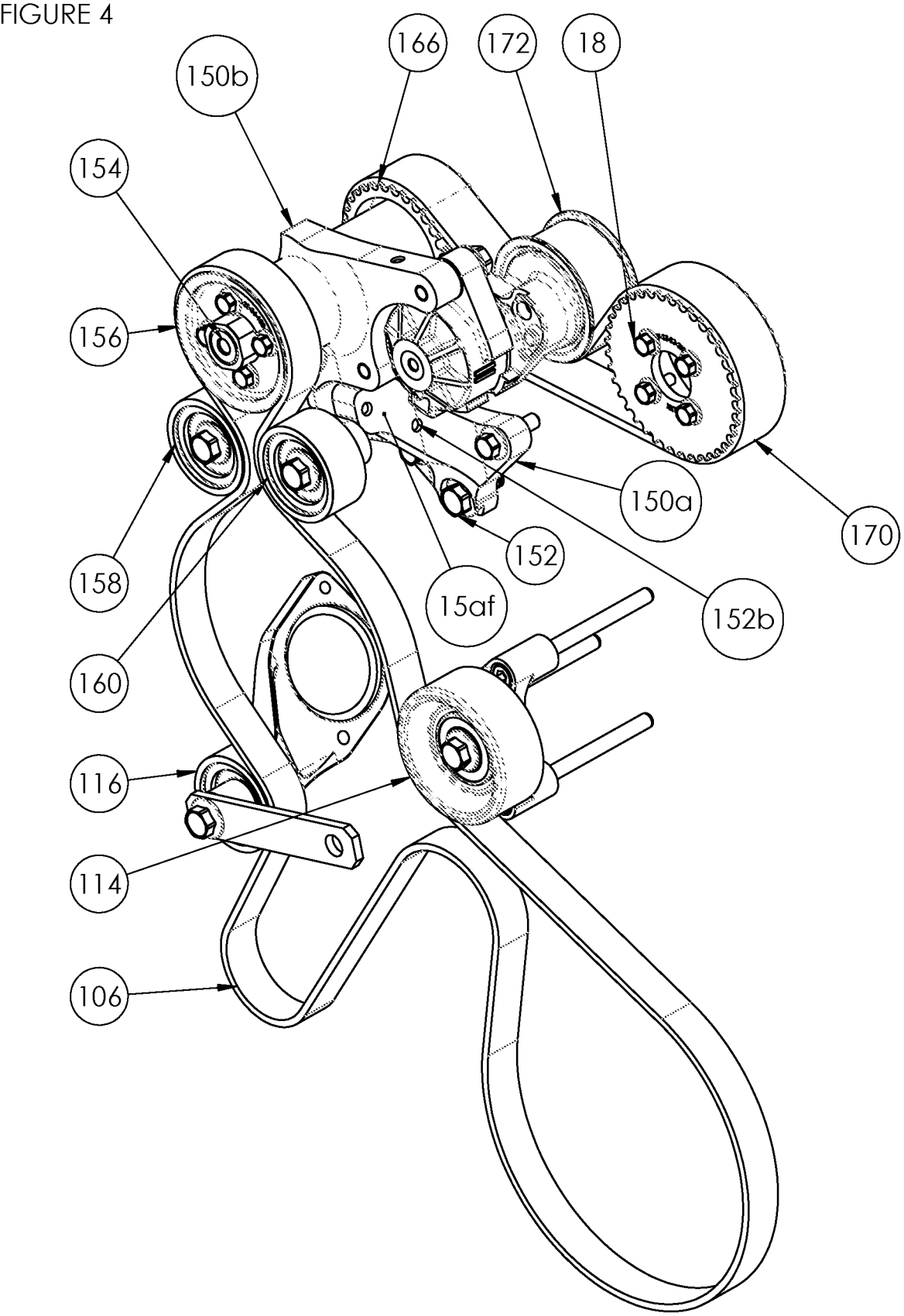
Figure 5:
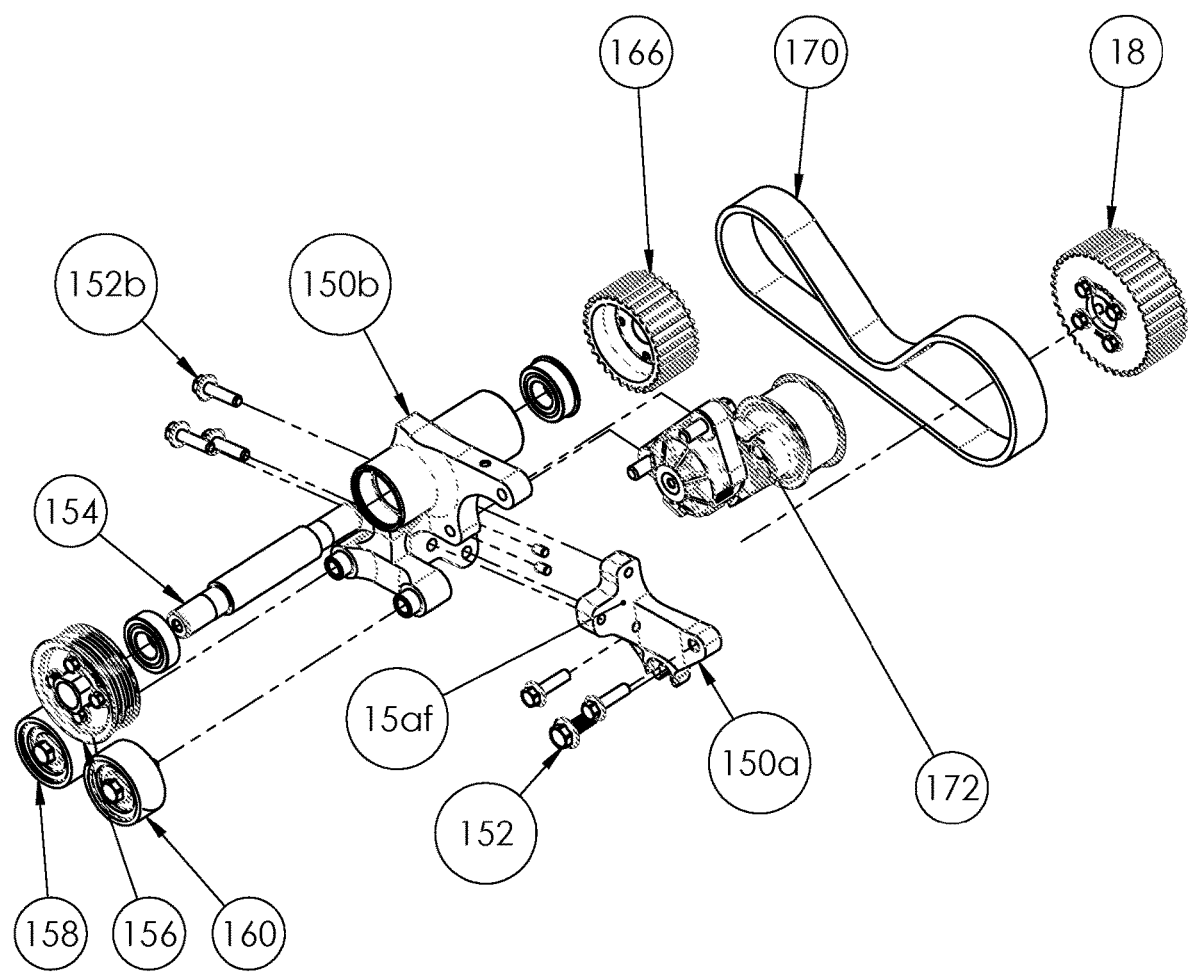
FIG. 5 is an exploded view of the drive path transfer apparatus according to the invention.

Another aspect of the invention relates to ease of maintenance and repair and installation of the drive path transfer apparatus A of the present invention. As shown in FIGS. 2, 4 and 5, the bracket 150 comprises a first component 150a that is attached to the engine block 100 with bolts 152. Preferably, use is made of the fact that the engine block 100 already has existing tapped bolt holes (present, for example, for use in attaching engine lifting and handling equipment during manufacture) that can be used to receive bolts 152 to secure bracket component 150a to the engine block. The bolts 152 extend fore and aft, i.e., axially parallel to the direction of the axis of the crankshaft pulley and can be accessed by tools in the small space available. The bracket 150 further comprises a second component 150b attached to a flange 15af extending rearward from the first bracket component 150a with bolts 152b accessible in the confined space available from the side of the engine, i.e., in a direction perpendicular to the fore and aft direction. The second bracket component 150b carries the coupling shaft 154 and attached input and output pulleys 156 and 166, and therefore enables these components to be removed for servicing and reinstalled simply by removing bolts 152b. This operation can be performed without removing the engine or any major components, and thus facilitates repair operations. Additionally, it is possible to install the drive path transfer apparatus A of the present invention without removing the engine from the engine compartment by first attaching first bracket component 150a to the engine block 100 with bolts 152, and then attaching second bracket component 150b to the first bracket component 150a with bolts 152b. The room available for installation of apparatus A when the engine is situated in the vehicle is extremely limited, but there is sufficient room to attach the first bracket component 150a by itself, and then there is room to attach the second bracket component to the first bracket component, whereas there would not be room to attach either a one-piece bracket or the two-piece bracket 150 in an assembled state, i.e., with the first and second components already attached, installation of either of which would require removal of the engine from the engine compartment.

Figure 6:
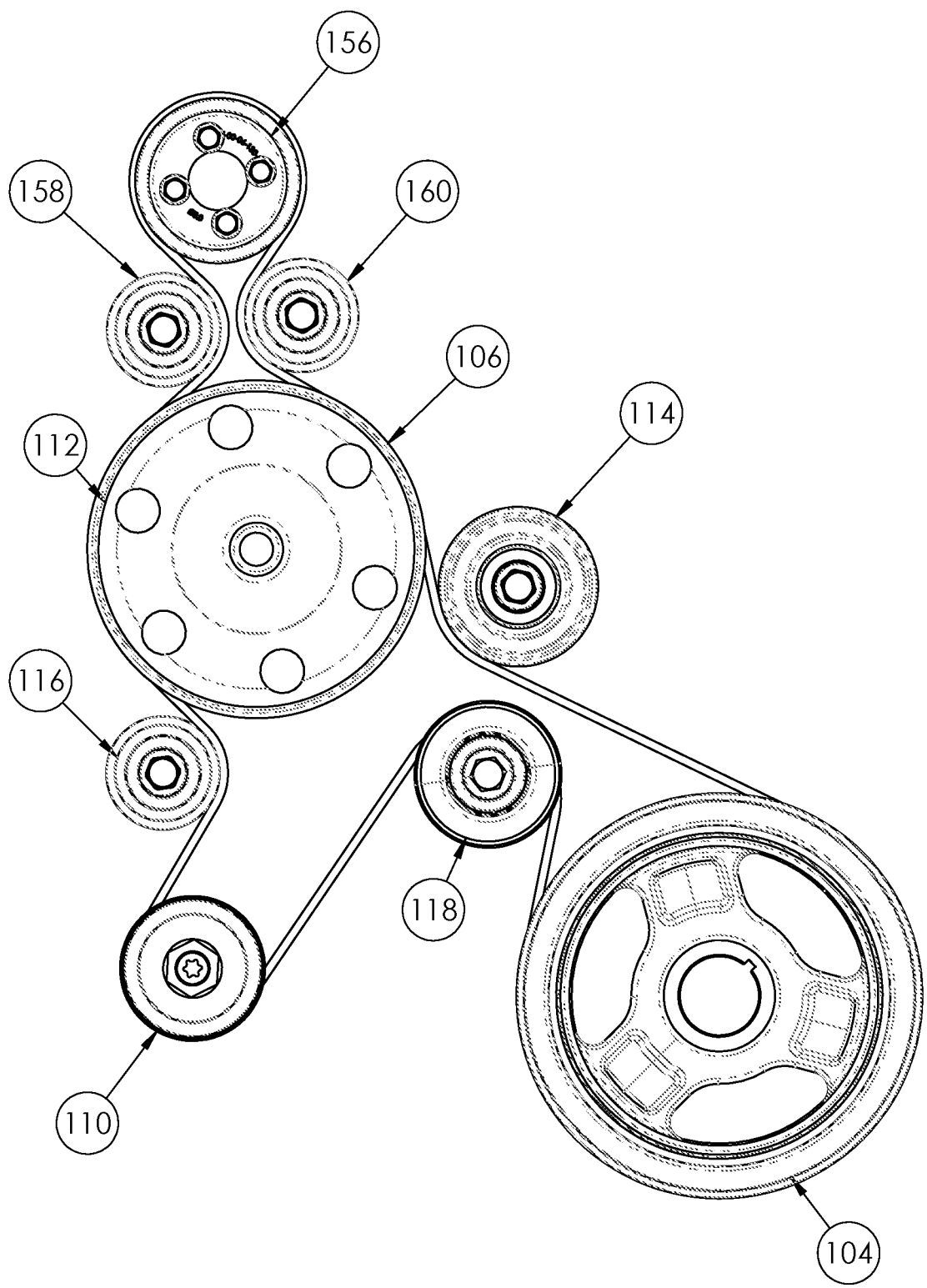
FIG. 6 is a diagrammatic view of the main drive belt path showing the use of idler/tensioner pulleys to improve belt grip on component pulleys.

A further aspect of the invention is shown in FIG. 6, which is a diagrammatic view of the path of the main drive belt 106. Crankshaft pulley 104 supplies power from the engine and the belt 106 transfers it to accessory devices through alternator pulley 110, pump pulley 112 and input pulley 156 which connects to the supercharger pulley 18 through coupling shaft 154, output pulley 166, and secondary drive belt 170. Idler/tensioner pulleys 114, 116 and 118 are located as shown to increase the circumferential contact area between belt 106 and pulleys 104, 110 and 112. The increased circumferential contact increases the frictional grip between belt and pulleys, improves power transfer, and reduces the likelihood of slippage. The addition of input pulley 156 to the belt path is of necessity in a location where the most direct belt path would reduce the circumferential contact of the belt 106 not only with the input pulley 156, but also with pump pulley 112, and therefore the invention provides idler/tensioner pulleys 158 and 160 positioned closely to one another adjacent the input pulley 156 and between the input pulley 156 and the adjacent accessory device pulley 112 to maintain greater circumferential contact with both the input pulley and the accessory device pulley.

While the present invention has been described with reference to preferred and exemplary embodiments, it will be understood by those of ordinary skill in the art that various changes may be made, and equivalents may be substituted for the described elements, without departing from the scope of the invention. In addition, many modifications may be made to adapt a particular situation to the teachings of the invention without departing from its scope. Therefore, it is intended that the invention not be limited to the particular embodiments disclosed, but that the invention include all embodiments falling within the scope of the appended claims.

The invention claimed is:

1. A supercharged engine having an engine block, a crankshaft pulley at one end of the engine block for transferring power to auxiliary devices, a main drive belt connected to the crankshaft pulley and to the auxiliary devices, a supercharger having a housing that is mounted on the top of the engine block, the supercharger having a pulley for transferring power to the supercharger, the engine having an obstructive object comprising a dry sump oil reservoir extending from the same end of the engine block as the crankshaft pulley and lying in the same plane as the main drive belt, and a drive path transfer apparatus comprising:
  a bracket attached to the engine block in a location away from the obstructive object,
  a coupling shaft carried for rotation by the bracket and having an input pulley at one end that is in the plane of and coupled to the main drive belt to be rotated by it, and having an output pulley at the other end that is located inboard of the input pulley and in a space positioned away from both the obstructive object and the supercharger housing,
  the supercharger pulley being located in the same plane as the output pulley and coupled thereto with a secondary drive belt, the bracket, the main drive belt, the input pulley, the output pulley, the secondary belt and the supercharger pulley all being positioned away from the obstructive object for operation free of obstruction by it,
  whereby the supercharger is powered by the crankshaft through a primary drive path comprising the main drive belt, and the input pulley, and then through a secondary drive path comprising the output pulley, the secondary belt and the supercharger pulley, the primary drive path transferring power to the secondary drive path through the coupling shaft without interference from the obstructive object.

2. The supercharged engine claimed in claim 1 wherein the bracket comprises a first bracket component attached to the engine block and a second bracket component attached to the first bracket component and carrying the coupling shaft and input and output pulleys.

3. The supercharged engine claimed in claim 2 wherein the first bracket component is attached to the engine block with a first set of bolts extending in a direction parallel to the axis of the crankshaft pulley and has a rearward extending flange, and the second bracket component is attached to the flange with a second set of bolts extending perpendicularly to the direction of the first set of bolts and accessible from the side of the engine.

4. The supercharged engine claimed in claim 1 further comprising a dynamic tensioner pulley for maintaining tension in the secondary drive belt that transfers power from the output pulley to the supercharger pulley.

5. The supercharged engine claimed in claim 1 further comprising idler/tensioner pulleys in contact with the main drive belt and positioned adjacent to the input pulley and between the input pulley and an adjacent auxiliary device pulley to maintain circumferential contact with both the input pulley and the auxiliary device pulley.

6. The supercharged engine claimed in claim 1 wherein the engine is a rear-mounted engine with an auxiliary drive facing rearward, and the supercharger is a roots-type supercharger with meshing rotors and having the pulley for transferring power to the supercharger rotors positioned at the rearward end of the supercharger, the obstructive object is located in the plane of the auxiliary drive and on the axis of the supercharger drive pulley, and the plane of the secondary drive path is in a space between the supercharger housing and the obstructive object.

7. A method for transferring power in an engine from an engine crankshaft pulley to a supercharger mounted on the top of the engine and having a drive pulley, the engine having an engine block, the engine crankshaft pulley being located at one end of the engine block, an auxiliary drive system at the one end of the engine block with a main drive belt that couples the crankshaft pulley to auxiliary device pulleys, and an obstructive object comprising a dry sump oil reservoir extending from the same end of the engine block as the crankshaft pulley and lying in the same plane as the main drive belt, the method comprising:

establishing a primary drive path comprising the crankshaft pulley, the main drive belt, and an input pulley located in the same plane as the crankshaft pulley and connected to it with the main drive belt, establishing a secondary drive path in a second plane spaced inboard of the first plane and comprising an output pulley, the supercharger pulley, and a secondary belt joining the output pulley and supercharger pulley, and transferring power from the primary drive path to the secondary drive path through a coupling shaft having the input pulley at one end and the output pulley at the other end, the coupling shaft being rotationally mounted in a bracket secured on the engine block in a location to the side of the obstructive object, thereby transferring power to the supercharger without interference from the obstructive object.

8. The method claimed in claim 7 wherein the bracket comprises a first bracket component attached to the engine block and a second bracket component attached to the first bracket component and mounting the coupling shaft and input and output pulleys.

9. The method claimed in claim 8 further comprising installing the bracket on an engine situated in a vehicle's engine compartment by first securing the first bracket component to the engine block with a first set of bolts extending on an axis parallel to the axis of the crankshaft pulley, and then securing the second bracket component to the first bracket component with a second set of bolts extending on an axis perpendicular to the axis of the first set of bolts and accessible from the side of the engine.

10. The method claimed in claim 7 wherein the secondary drive path includes a dynamic tensioner pulley to maintain tension in the secondary belt.

11. The method claimed in claim 7 wherein the primary drive path includes idler/tensioner pulleys in contact with the main drive belt and positioned adjacent to the input pulley and between the input pulley and an adjacent auxiliary device pulley to maintain circumferential contact with both the input pulley and the auxiliary device pulley.

12. The method claimed in claim 7 wherein the engine is a rear-mounted engine with an auxiliary drive facing rearward, and the supercharger is a roots-type supercharger having the pulley for transferring power to the supercharger rotors positioned at the rearward end of the supercharger, the obstructive object is located in the plane of the auxiliary drive and on the axis of the supercharger drive pulley, and the plane of the secondary drive path is in a space between the supercharger housing and the obstructive object.

\* \* \* \* \*